Feb. 13, 1934. P. KOLLSMAN Re. 19,079

ALTIMETER

Original Filed Dec. 10, 1931 4 Sheets-Sheet 1

INVENTOR
PAUL KOLLSMAN
BY Clarence Day
ATTORNEY

Feb. 13, 1934. P. KOLLSMAN Re. 19,079

ALTIMETER

Original Filed Dec. 10, 1931 4 Sheets-Sheet 2

INVENTOR
PAUL KOLLSMAN
BY Ronald Ray
ATTORNEY

Feb. 13, 1934. P. KOLLSMAN Re. 19,079

ALTIMETER

Original Filed Dec. 10, 1931 4 Sheets-Sheet 3

INVENTOR
PAUL KOLLSMAN
BY Leonard Day
ATTORNEY

Feb. 13, 1934. P. KOLLSMAN Re. 19,079

ALTIMETER

Original Filed Dec. 10, 1931 4 Sheets-Sheet 4

INVENTOR
PAUL KOLLSMAN
BY
Clarence Dey
ATTORNEY

Reissued Feb. 13, 1934

Re. 19,079

UNITED STATES PATENT OFFICE 19,079

ALTIMETER

Paul Kollsman, New York, N. Y.

Original No. 1,857,311, dated May 10, 1932, Serial No. 580,119, December 10, 1931. Application for reissue October 27, 1932. Divided and this application December 20, 1933. Serial No. 703,328

42 Claims. (Cl. 73—4)

Figure 1:
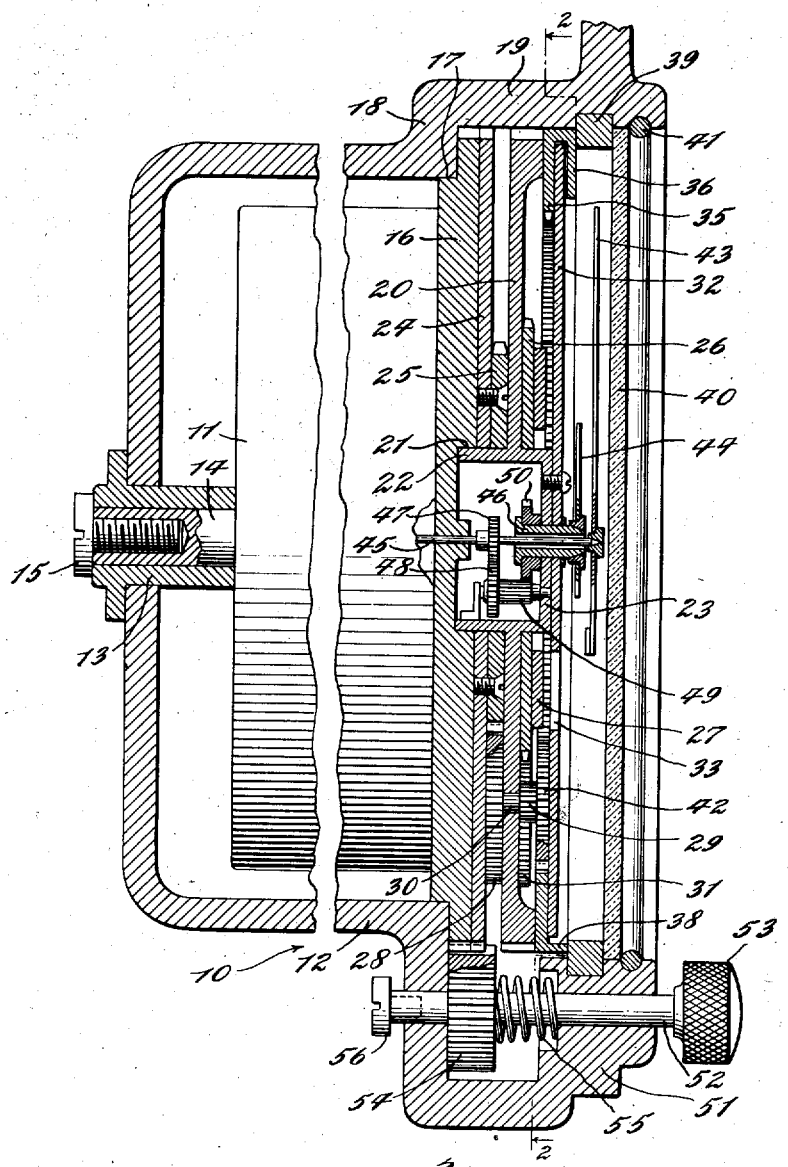

This application is a division of my co-pending application Serial No. 639,897, for the reissue of my Patent No. 1,857,311, said application having been filed on October 27, 1932.

This invention relates to altimeters and more particularly to aneroid altimeters. A quicker and more dependable understanding of the objects of the invention will be had by referring first superficially to the structure by reference character. The outer stationary casing 12 is a housing for mounting the whole altimeter in an instrument panel. Any well-known type of aneroid or barometric pressure responsive mechanism included in the aneroid means 11 operatively connects and rotates the spindle 45 of large pointer 43 in response to changes in barometric pressure. Spindle 45 passes freely through the front plate 16 of the aneroid means 11 into the interior of its enclosing sub-casing. This front plate 16 is made fast to the sub-casing of the aneroid means 11 and is in the form of a gear by which the aneroid means is rotatedly adjustable relatively to the stationary casing 12 by a setting means.

The parts visible through the glass 40 broadly speaking are indicating means or elements. In this broad class are included pointer means, pointer elements or pointers such as the pointers 43 and 44, which preferably constitute all of the indicating means which is moved by the power of the aneroid means. Also included under the broad definition "indicating means" are the dial means or scale means such as the dials 32, 58, and 59. Likewise broadly included under the term "indicating means" are the reference means, reference elements, or reference marker, such as the reference elements 36, 60, and 27, although the reference element 27 is shown in the form of a rotatable member bearing a series of indicating reference numbers.

Setting means manually operable by the knurled knob 53 functions to effect relative setting movements or adjustments involving some or all of the indicating means and, if desired, the aneroid means. This setting movement, effected by the setting means, is in contradistinction to the operative movements of the pointer means by the aneroid mechanism of aneroid means 11—altitude responsive means.

One general object of the invention is to provide for relative adjustment movements between various elements of the indicating means of an aneroid altimeter in a simple and efficient manner without interfering with the indicating functioning of the instrument in response to the aneroid means. More particularly, an object of the invention is to provide for the adjustable manual setting of the altimeter relatively to a predetermined altitude such as the altitude of a landing field, designated either in feet altitude or barometric pressure, so that contemporaneous changes are made in the indication of reference means and an altitude indicating means, both, if desired, throughout a complete rotation of a reference element, and so that the sum of the said changes is a constant and is equal to zero in the same unit of measure.

A further particular object of the invention is to simplify and speed up the reading of an indicating instrument over a wide range. To this end I provide a dial having a single scale divided uniformly from one to ten, cooperating with two unlike pointers concentric with the said scale and operating in response to the aneroid means in proportion to changes in barometric pressure in the ratio of one to ten, with their zero positions corresponding to the zero on the single scale. By this arrangement, in carrying out this object of my invention, the complete rotation of one pointer may represent a thousand foot change in altitude, which is indicated by the other pointer by one major division on the scale.

A large pointer may be a high speed pointer and a shorter pointer a low speed pointer. If the short pointer indicates somewhere between "2" and "3" on the single scale, and the long pointer indicates "5", a glance at the pointers on the single scale instantly indicates 2500 feet without any cooperative calculation. This indicating means instantly indicates altitude in strict accordance with the decimal system with all the accuracy of a sensitive pointer and all the necessary range of a slow motion pointer.

A further object of the invention is to provide suitable interconnecting gearing and setting means for setting such pointers having a ten to one ratio to accord with the setting of a reference element, preferably to any indication throughout the entire practical range of flying, and so as to accord with my heretofore mentioned object of causing the sum of setting changes to equal zero.

Further objects of my invention are to simplify mechanism for giving a true aneroid indication and for manually adjusting the indicating means relatively to a reference condition and to compensate for age and maladjustment.

The above and further objects of the invention will be particularized more fully in the following claims, which are directed to illustrative embodiments of the invention described in the following specification in connection with the accompanying drawings for purposes of illustration and not limitation.

Figure 2:
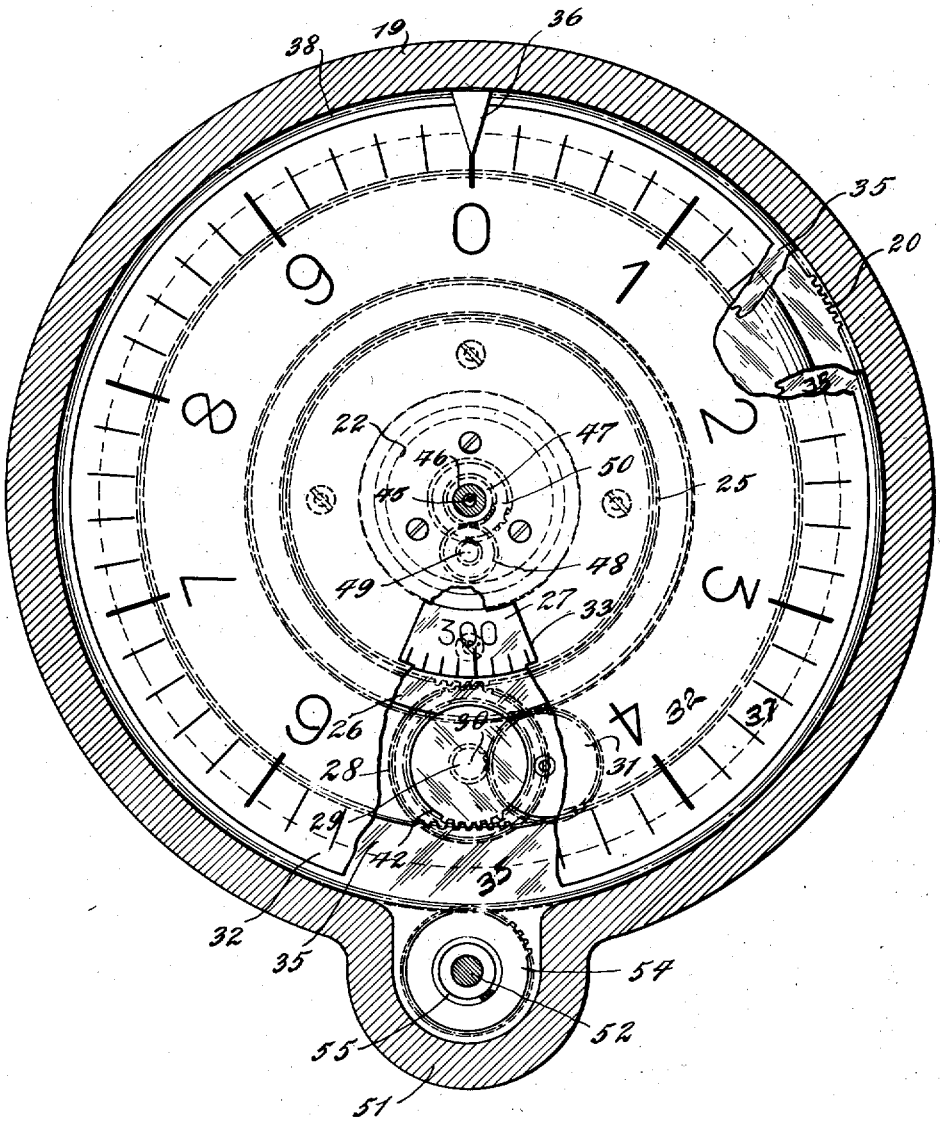
Figure 4:
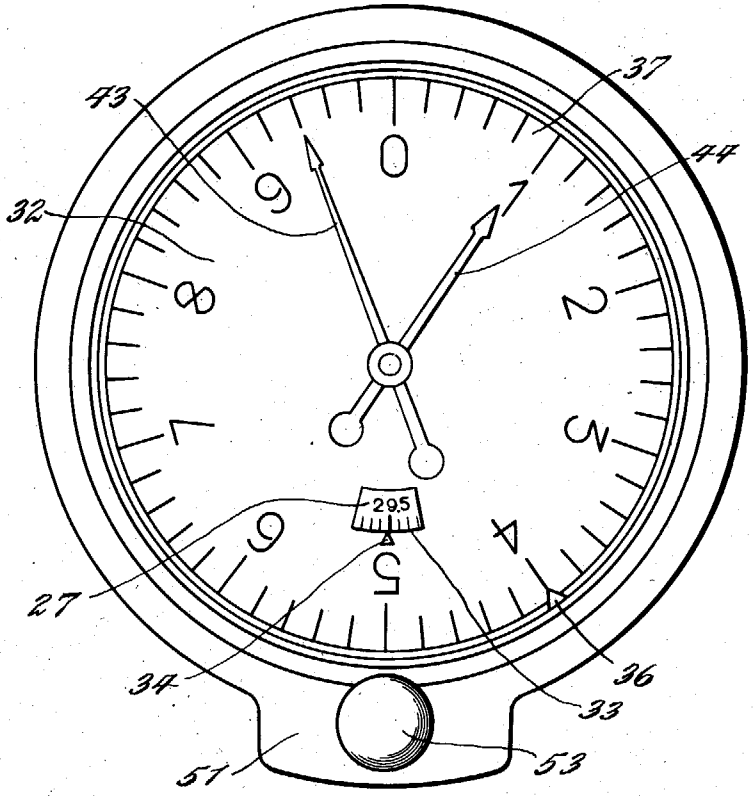
Figure 3:
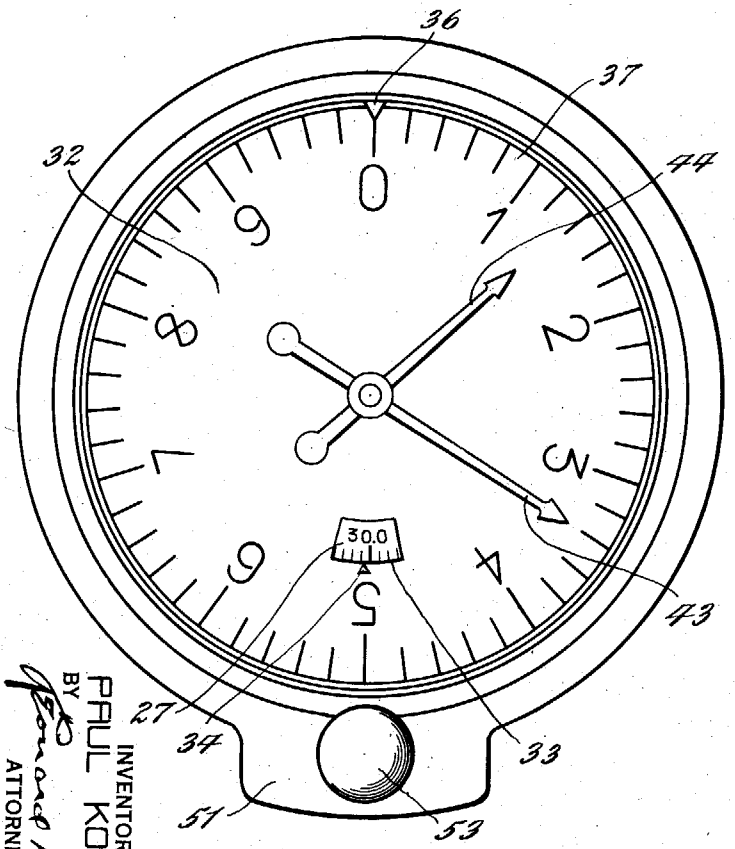
Figure 6:
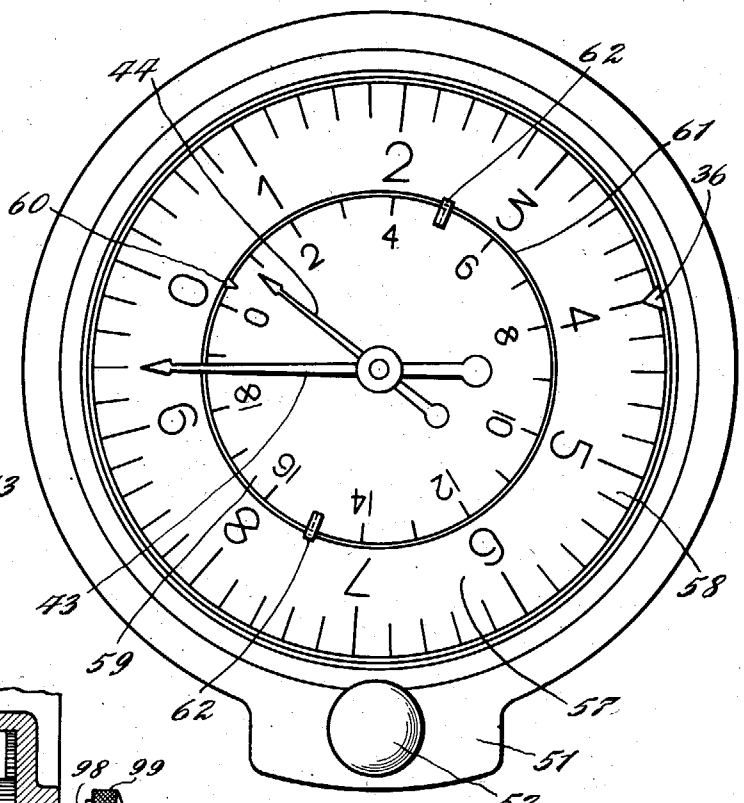
Figure 7:
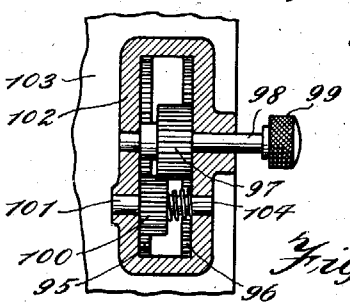
Figure 5:
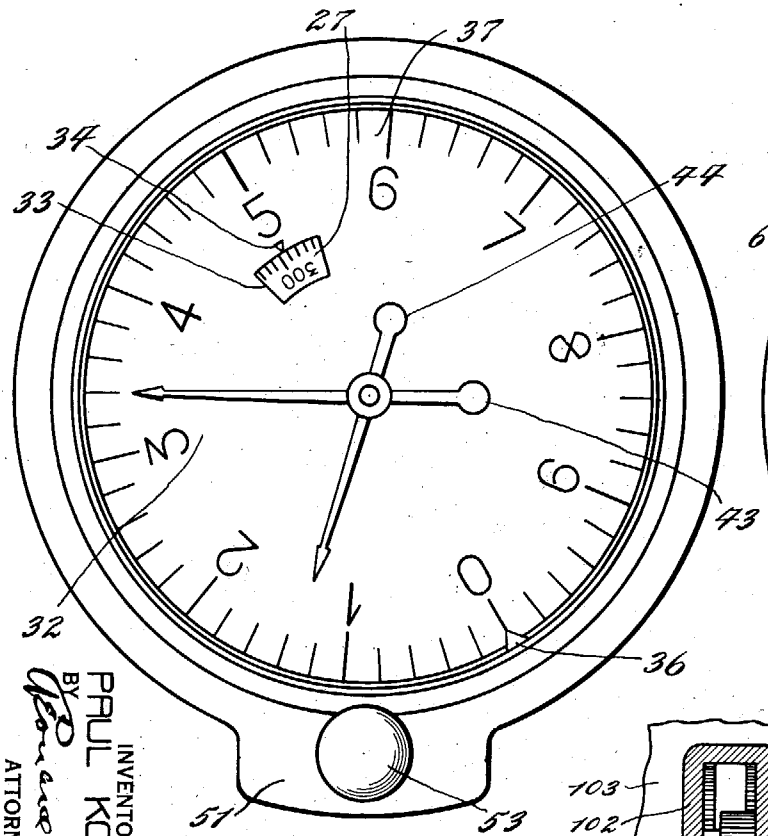

In the drawings Fig. 1 is an enlarged vertical section through the altimeter at right angles to its normal position on the instrument board, with part broken away at the locality of the aneroid means; Fig. 2 is a section at right angles to the section of Fig. 1 through the plane of line 2—2; Fig. 3 is a front elevation of the altimeter with one embodiment for the indicating means indicating the elevation of 1340 feet relatively to sea level; Fig. 4 is a view similar to Fig. 3 of the same instrument set for landing on a landing field with an altitude of 400 feet; Fig. 5 is a view similar to Fig. 3 of the same instrument and with the same setting, but with the indicating means rotated for level flight in accordance with one object of the invention; Fig. 6 is a front elevation of the altimeter of my invention, with a modification of the indicating means and with the indicating means set for level flight at 940 feet net and subsequent landing upon a landing field with the elevation of 400 feet above sea level; and Fig. 7 is a horizontal section looking upward through the setting mechanism in modified form.

The embodiment of the indicator shown is an altimeter 10 of the type actuated by an atmospheric pressure sensitive means, shown in the form of any approved aneroid means 11, the entire mechanism of which is preferably housed within a cylindrical shell or subcasing mounted preferably concentrically within the stationary casing 12 adapted to be fixedly mounted in the instrument panel in the position indicated in the figures.

Broadly speaking, such aneroid means provides a yielding element operated by a varying force.

The entire aneroid means is shown mounted for manual adjustable rotation. A hub 13, suitably fixed to and axially of the stationary casing 12, journals a stub shaft 14 fixed to the sub-casing of the aneroid means 11, and is shown retained by a screw 15. The front of the aneroid means is closed by a front plate 16 fixed thereto and shown in the form of a gear. This gear 16 has a circular recess 17 affording rotary bearing engagement on an angular portion 18 of housing 12. By reason of this angular formation 18 an annular enlargement 19 is afforded for receiving the toothed part of the gear 16 and other parts presently to be described.

Associated with and in front of the gear 16 is a gear 20, which is shown to be concentric with and of equal diameter with the gear 16 and, under certain conditions, may be rotatable relatively thereto. This gear 20 may be mounted in a suitable manner. It is formed integral with a hub 22 bearing in the circular recess 21 formed concentrically with the gear 16. The cylindrical hub 22 has a front wall or closure 23, serving as a mount for other parts presently to be described.

Journaled externally on the cylindrical hub 22 is a gear 24 in front of the gear 16 and between it and the gear 20, but spaced apart therefrom a sufficient amount to accommodate the gear 25 of smaller diameter and made fast thereto in any suitable manner, as by screws. This gear 25 is of smaller diameter than gears 16, 20, and 24 and is determined by a gear ratio presently to be described.

Also journaled on the exterior of cylindrical hub 22, but on the front side of gear 20, is a gear 26 of smaller diameter. This gear 26 functions to carry a reference means such as the ring shaped numeral bearing rotary member 27 or the single reference marker 60 of Fig. 6. The rotary reference member 27 bears numerals in graduated order indicating barometric pressures as they rotate into visibility through window 33. Both the reference members 27 and 60 may rotate freely 360° or more and their rotation is not limited by any stops.

Interconnecting the gears 25 and 26 is a gear train including pinions 28 and 29, both fixed to the same stub shaft 30 concentric therewith and thereby journaled in a perforation through gear 20. These gears 28 and 29 are positioned on opposite sides of gear 20,—28 in the rear thereof and 29 in front thereof. The pinion 28 engages gear 25 and pinion 29 may engage a gear 31, journaled on the web of gear 20 and gear 31 is shown in turn engaging the gear 26, whereby various relative rotations may be caused to take place, in accordance with any one of various manual manipulations of a setting means presently to be described.

A dial 32 is fixed relatively to gear 20 by being mounted fixedly to the front closure 23 of hub 22. This dial 32 has a window 33 in the embodiment shown in Figs. 1, 2, 3, 4, and 5, through which various reference elements or marks such as numbers indicating various barometric pressures in inches of mercury and fractions thereof may be observed. By reason of the fact that the rotatable member of cylindrical or ring-shaped dial 27 is capable of a complete rotation, relatively generous spacing may be employed, even though the entire range of barometric pressure, throughout which range it may be desired to make a reference setting, is employed and numerically designated on this rotatable member 27.

In the embodiment of Fig. 6, the reference marker 60 is substituted for the rotatable barometric pressure member 27 bearing a series of numbers and this reference marker 60 may cooperate with a relatively stationary dial, later to be described and cooperating with the reference marker 60 to give a reference indication.

Between the dial 32 and the gear 20, or between the dial 57 of Fig. 6 and the gear 20, may be provided an internal gear 35 for carrying a second reference means shown in the form of a reference element or marker 36 and which, in Figs. 1, 2, 3, 4, and 5, cooperates with circular scale 37 on dial 32, and in Fig. 6 cooperates with scale 58 on dial 57. This gear 35 may slidingly rest against a peripheral flange of the gear 20 and may itself have a flange 38, retained by a resilient split locking ring 39, that may also afford a base for a glass 40 which may, in turn, be locked in place by a split ring 41.

It should be noted that none of the gears 16, 24, 20, and 35 are operated by the aneroid means 11. They are operable solely in response to the manual manipulation of the setting means and, as indicated particularly in Figs. 1 and 2, rest in the annular enlargement 19 of the stationary casing 12 in frictional engagement therewith, which frictional engagement is at their extreme periphery, the mass of the parts tending to hold them in fixed position relatively to the fixed casing 12 until and unless they are manually adjusted by the setting means presently to be described.

For rotating the gear 35 carrying the reference marker 36 a pinion 42 may be secured on the shaft 30 in addition to the gears 28 and 29, already having been described as carried by the same shaft 30. This shaft 30 and pinions 28, 29, and 42 rotate as a unit when operated in any one of the ways presently to be described. Pinion 42 operatively engages internal gear 35.

In its complete and preferred embodiment, the altimeter has as its pointer means, a long pointer 43 and a short pointer 44, which are relatively rotatable in predetermined different degrees by the aneroid means 11, which operates through any well known connecting mechanism to rotate the spindle 45 equal angular amounts in proportion to equal changes in feet altitude. The spindle 45 extends freely through the front plate or gear 16 and through the hollow shaft or rotatable hub 46, journaled in an opening in wall 23 and dial 32 for Figs. 1, 2, 3, 4, and 5, and dial 59 for the embodiment of Fig. 6.

The long or sensitive pointer 43 is secured on spindle 45, and the short or range pointer 44 is carried by the hollow shaft 46. Interconnecting shafts 45 and 46 is a planetary gear train. A gear or pinion 47 is fast to the spindle 45 and meshes with gear 48. Pinion 49 is fixed to the same shaft as is gear 48, which shaft is journaled to the cylindrical hub 22, 23, which is integral with the gear 20. Pinion 49 meshes with gear 50 fixed to the hollow shaft 46 and serving to drive the range pointer 44 at any desired ratio relatively to pointer 43, preferably at the angular speed ratio of one to ten. At this point it should be noted that it is the rotatability of the cylindrical hub 22, 23 which mounts the shaft of gear and pinion 48 and 49 which constitutes the sun and planet relation in this gearing, the advantage of which will later be described.

The manually operable setting means is mounted in an extension 51 of the circular casing enlargement 19. A shaft 52 slidably extends from front to rear through this enlargement 51 and has fixed thereto a pinion 54 which, together with the shaft 52, is urged rearwardly by the compression spring 55, preferably seated in a pocket. A removable set screw 56 secured in the rear end of shaft 52 serves as a removable locking means limiting the setting operation of the pinion 54. By suitable manipulations of the setting means, various combinations of the gears 16, 24, and 20 may be operated by means of the pinion 54. With the safety locking screw 56 in place, only two combinations may be operated. With the parts positioned as shown in Figs. 1 and 2, a simple rotation of the knob 53 drives both gears 16 and 24, while gear 20 is held stationary relatively to the casing 12 in any suitable manner, as by its frictional engagement therewith. This is setting combination or position No. 1.

With the apparatus as shown in Fig. 1, by pulling out on the knob 53 and turning it, pinion 54 is caused to engage all three gears 16, 24, and 20, to effect a simultaneous rotation of said three gears. This is combination or position No. 2.

If the safety locking screw 56 is removed, and the knob 53 is pulled forward slightly further than for position No. 2, pinion 54 may be caused to engage solely gears 24 and 20, whereupon a rotation of the knob 53 rotates said gears 24 and 20, while gear 16 is held stationary relatively to casing 12, as by its frictional engagement therewith. This is combination or position No. 3.

If the knob 53 is pulled still farther forward, pinion 54 will be caused to mesh solely with gear 20, whereupon a rotation of knob 53 rotates gear 20, gears 16 and 24 being held stationary in any suitable manner, as by reason of their frictional engagement with the stationary casing 12. This is combination or position No. 4.

*Operation*

With the parts in the position shown in Fig. 1, a rotation of shaft 52 and its pinion 54 clockwise as shown in Fig. 2, a manual setting of the altimeter may be effected with reference to a particular condition, such as the foot altitude of a landing field, the barometric pressure at a landing field, the foot altitude desired for level flight, or the barometric pressure corresponding to desired level flight. In making this manual setting (position No. 1), the pointers 43 and 44 and the reference element 36, all three relatively to the scale means upon which they read, are caused to change their indications so that the sum of the changes is equal to zero and therefore equal to a constant. Likewise a relative change between the numerical barometric pressure indications of the rotatable reference element 27 is to be made so that the sum of its change plus the change of the pointer means is also equal to a constant and to zero in the same unit of measure.

By reason of the fact that the rotary members 27 and 60 are not limited in their rotation but are free to rotate a complete rotation or 360° and more, substantially no limits are imposed upon the gear train including gears 25, 28, 29, 37 and 26, which gear train determines the angular rate of rotation for the member 27 relatively to other rotary parts such as the fast pointer 43 and the slow pointer 44. From the drawings it may be determined approximately what this relative angular rate of rotation is. The gear ratio between gears 29 and 37 is shown to be approximately 5 to 1 while the ratio of gear 25 to gear 26 through their interconnecting gears 28 and 31 is approximately 8 to 7. The complete gear train therefore gives an angular speed to the rotary member 27 relatively to gear 25 and gear 24 of 7 to 40. The rate of rotation of fast pointer 43 is unity or one. As previously described the rate of rotation of slow pointer 44 is one-tenth. Therefore, in the showing of the drawings rotary member 27 rotates slower than the fast pointer 43 and faster than the slow pointer 44, seven-fortieths being less than one and more than one-tenth.

*Position No. 1*

Fig. 3 shows a position of the indicating means indicating an altitude of 1340 feet, which is indicated by the pointers 43 and 44 on scale 37 relatively to zero altitude or sea level, as indicated by reference marker 36 positioned at zero, while the barometric pressure element 27 indicates 30.0 as the nearest corresponding number for normal sea level barometric pressure. Assume that it is now desired to set the altimeter for landing upon a landing field with the elevation 400 feet. By telephone communication with the landing field, the foot altitude of the landing field, 400 feet, may be obtained or the corresponding barometric pressure, 29.5, may be obtained.

If the foot altitude is obtained, a clockwise rotation of knob 53, as viewed in Figs. 3, 4, and 5, serves to move the reference marker to indicate 400 feet, as shown in Fig. 4. The gearing intergearing rotatable reference element 27 causes this element to indicate the barometric pressure 29.5 corresponding to 400 feet. In like manner, if the barometric pressure of the landing field and not its foot altitude is obtained, the same clockwise rotation of knob 53 is imparted until the barometric pressure 29.5 is indicated through window 33, whereupon the corresponding foot altitude will be indicated by the reference marker 36 upon the scale 37.

Now, at the same time that these reference elements 36 and 27 are being set to correspond with the landing field condition, the pointer means is moved counterclockwise or in a negative manner to subtract 400 feet altitude from its indication in Fig. 3, so that in Fig. 4 it correctly indicates 940 feet, the distance above the landing field, so that the pointer means will indicate zero when the level of the landing field is reached.

It is thus clear that the sum of the negative change of the pointer means relatively to its scale 37 and the positive change of the reference means 36 relatively to the same scale 37 is numerically zero, and therefore equal to a constant. In like manner, by altering the barometric pressure change from the showing that corresponded to sea level to that corresponding to the atmospheric pressure at the landing field into feet altitude, again the changes are equal to zero.

*Position No. 2*

It may be desired to continue flying at level flight at the altitude of 1340 feet. To facilitate this, with the parts in position No. 2, a rotation is imparted to knob 53, with the indicating means indicating as shown in Fig. 3 until the sensitive pointer 43 is horizontal, as shown in Fig. 5. No change in the altitude indication or reference means takes place, but the sensitive pointer 43 is horizontal so that any increase in altitude from level flight is indicated by a movement above horizontal of pointer 43 and any change below level flight is indicated by a movement of pointer 43 below horizontal. This is a more convenient telltale than the necessity of reading pointer movement from a position such as that shown in Fig. 3.

In Fig. 6 pointer 43 and 44 are intergeared in the ratio of twenty to one. Pointer 43 cooperates with scale 58 on dial 57, scale 58 being the same as scale 37, and in similar cooperation with reference marker 36. Instead of the barometric pressure indicating reference element 27, however, a reference marker 60 is substituted and geared to move commensurately with but in negative relation to the motion of pointer 44. Both pointer 44 and reference marker 60 read on scale 59. The central dial bearing scale 59 is secured to dial 57 by means of transparent bridges 62, leaving the circular slot or pathway 61 for the free travel of the reference marker 60 for a complete rotation beneath the bridges 62.

In the showing of Fig. 6, the indication of the altimeter is for level flight at an elevation of 940 feet above a landing field with elevation of 400 feet. The setting of the instrument shown in Fig. 6 combines the settings of Figs. 4 and 5 for a plane at the elevation of 1340 feet above sea level. One advantage of the modification of Fig. 6 is that both sensitivity and range for a reference setting from zero feet altitude up to 20,000 feet altitude or more is permissible.

*Position No. 1—Gear movement*

A clockwise rotation of knob 53, assuming the aneroid indication to be as shown in Fig. 3, is imparted until either the reference marker 36 indicates the desired reference condition or the rotatable reference element 27 indicates the desired reference condition. The gear functioning to effect this setting is as follows: Gear 20 is held fast by any suitable provision such as friction. Counter-clockwise rotation is imparted to gears 16 and 24. Gear 25, fixed to gear 24, rotates counter-clockwise and imparts clockwise rotation to gears 28 and 29 and 42. Gear 29 imparts counter-clockwise rotation to gear 31 and gear 31, in mesh with gear 26, imparts clockwise rotation thereto. The gear ratio of the train and the numeral marking are designed to transform feet altitude into barometric pressure in inches of mercury for rotary reference element 27, and one twentieth of foot altitude indication for reference marker 60 relatively to the angular movement of pointer 43.

The clockwise rotation of gear 42 meshing with internal gear 35 imparts clockwise rotation to gear 35 and the reference marker 36 carried thereby. The gear train operating reference marker 36 is designed to impart the same angular movement to reference marker 36 as that imparted to gear 16 but in the opposite direction. The counterclockwise rotation of gear 16 carries the entire aneroid means 11 in a counter-clockwise rotation so that the pointer moves negatively the same angular amount that the reference marker 36 moves positively, and by reason of the stationary positioning of gear 20, including the planetary mounting for the ten to one gear train 47, 48, 49, 50 operating pointer 44 from spindle 45, a commensurate ten to one reduced negative movement is imparted to pointer 44 in perfect synchronized accuracy. At the same time that the setting adjustment is being made, there is no interference with the operative functioning of the aneroid means 11 upon the pointers 43 and 44 through the spindle 45.

*Position No. 2—Gear functioning*

By reason of the fact that the pinion 54 simultaneously engages the teeth of gears 16, 24, and 20, no movement of gear 42 on its shaft 30 is possible, so that it serves as a fixed gripper for internal gear 35, causing internal gear 35 with its reference marker 36, as well as the aneroid means, pointers and scales, and, in fact, all the indicating means, to move as an entirety from the position shown in Fig. 3, for example, into the position shown in Fig. 5. This setting movement is effected also without interfering, during its progress or after its completion, with the operative functioning of aneroid means 11.

*Position No. 3—Gear functioning*

In position No. 3, pinion 54 engages solely gears 24 and 20, gear 16 with the rest of the aneroid means being suitably held in fixed position as by frictional engagement with the stationary casing 12.

Gears 24 and 20, being relatively non-rotatable by reason of the simultaneous engagement of their teeth by pinion 54, prevent any rotation of gears 28, 29, and 42 about their axis 30, although they do revolve about the major axis passing through spindle 45 in the angular amount that rotation is imparted to gears 24 and 20. Pinion 29 holds gear 31 against rotation on its axis, although it revolves about the central axis and acts as a gripper for gear 26 carrying the reference element 27 or 60, as the case may be. Likewise the non-rotating gear 42 serves as a gripper for the internal gear 35 carrying reference marker 36. An adjusting setting movement is therefore imparted to reference elements 27 and 36 and dial 32.

In addition, the rotation of the planetary mounting 22, 23 carrying the shaft of gears 48 and 49 imparts an adjusting movement to pointer 44 relatively to pointer 43, then stationary by reason of the fact that the aneroid means 11 with its spindle 45 is then stationary, provided the ratio of gear 47 to gear 48 is unequal to the ratio of gear 50 to the pinion 49. Obviously, if such ratios were identical, the planet gears would roll about the two sun gears 47 and 50 without causing any relative rotation between the gear 50 and the gear 47. Such, however, is not the case and the corrective adjustment is effectable by reason of this planetary gear arrangement. This adjusting movement may be effected in either angular direction to impart a relative corrective setting for the elements of the indicating means just enumerated.

*Position No. 4—Gear functioning*

It is assumed that the indication of the altimeter is the same as that described for position No. 1 gear movement, namely, as is shown in Fig. 3, indicating an elevation above sea level of 1,340 feet, and that it is desired to set the altimeter for landing upon a landing field with an elevation of 400 feet above sea level so as to obtain an indication like that shown in Fig. 4.

To effect this setting of the altimeter as was described in connection with position No. 1, a clockwise rotation was imparted to the finger knob 53. For accomplishing it in this other way, namely that of position No. 4, a counter-clockwise rotation is imparted to knob 53 and in consequence, a counter-clockwise rotation of pinion 54 results. The counter-clockwise rotation of pinion 54 causes a clockwise rotation of gear 20, now functioning as a planetary journaling for the multiple gear unit 28, 29, and 42 on the same shaft 30, large gears 16 and 24 being held stationary in a suitable manner by reason of their frictional engagement with the stationary casing 12 at the portion 19. Gear 28 functioning as a planet gear about central axis 45 and in toothed engagement with the then stationary gear 25 is caused to rotate about its axis 30 in a clockwise direction, and also gears 29 and 42 forming a unit with gear 28. Gear 29 in mesh with gear 31 drives gear 31 counter-clockwise. Gear 31 rotating counter-clockwise in turn drives gear 26 clockwise, and gear 26, carrying the rotary reference member 27 or 60, imparts a clockwise setting adjusting movement to either the rotary member 27 or 60—27 for the form in Figs. 3, 4, and 5 and 60 for the form shown in Fig. 6. During this rotation of the reference member 27 clockwise, the pointer 43 has remained stationary relatively to casing 12 by reason of the fixed stationary positioning of the aneroid means 11 but dial 32 with its scale 37 has been rotated clockwise relatively to casing 12, just the angular amount that gear 20 has been rotated, by reason of the fact that it is secured on the hub 22, 23 of this gear 20. However, this clockwise rotation of the dial 32 does not interfere with the setting of the reference marker 36 on scale 37 of dial 32 so as to indicate the 400 foot elevation of the landing field, by reason of the fact that the reference marker 36 is caused by this sun and planet arrangement to travel angularly at twice the angular rate relatively to casing 12 of the rate at which the dial 32 is rotated and likewise clockwise. The proper setting is indicated on the instrument as soon as the reference marker 36 coincides with the major marking 4 of scale 37, although for this second method of setting, the scale indication 4 no longer occupies the position shown in Fig. 4, but has traveled around to the angular position indicated in Fig. 4 by the position of the mark 8 and the zero of scale 37 has been caused to occupy the position of the mark 4 as shown in Fig. 4. By this functioning, the negative setting of the pointer 43 relatively to the scale 37 is accomplished by moving the scale 37 negatively relatively to the stationary pointer 43 instead of moving the pointer 43 negatively with relation to the scale. This setting adjustment in accordance with position No. 4 not only fixes the position of the reference marker but has caused the pointer 43 to indicate 940 on scale 37.

The clockwise rotation of rotary reference member 27 has now caused a numerical indication of the barometric pressure corresponding to the 400 foot altitude of the landing field to be displayed through window 33. It is to be understood, therefore, that this No. 4 position setting can be effected by rotating the knob 53 counter-clockwise until the proper barometric pressure corresponding to that at the landing field is indicated through the window 33, provided it is barometric pressure that was obtained as by telephone communication with the landing field instead of foot altitude. Foot altitude makes it convenient to adjust the reference marker 36, whereas barometric pressure at the landing field makes it convenient to set by means of the numeral bearing reference marker 27 shown through window 33.

So far, there has been described the proper relative setting between scale 37, pointer 43, reference marker 36, and reference marker 27. An advantage of this invention in connection with pointer 44 is also present.

The rotation of gear 20 clockwise the equivalent of four major divisions on dial 32 revolves the common planet shaft of gears 48 and 49 clockwise an equal angular amount. By reason of the ten to one ratio in the gear train 47, 48, 49, and 50, this sun and planet functioning effects a counter-clockwise rotation of the short pointer 44 one-tenth of the relative rotation between dial 32 and the long stationary pointer 43, so as to cause it to indicate the nine-tenths or less than unit indication on scale 37. Thus it is to be seen that both pointers 43 and 44 indicate relatively to the scale 37 by reason of this No. 4 position adjustment exactly as they indicate relatively to the scale 37 in Fig. 4. Now, if desired, the knob 53 may be manipulated in position No. 2 to rotate the entire indicating apparatus and aneroid so as to cause an indication exactly as is shown in Fig. 4.

There has now been described the complete functioning through the medium of position No. 4 to effect a setting as is indicated in Fig. 4. Obviously, such could not be the case if the shaft for gears 48 and 49 was fixed relatively to the casing 12 or relatively to the aneroid means 11. For the ten to one ratio between pointers 43 and 44, gear 48 divided by gear 47 times gear 50 divided by gear 49 should equal ten.

This setting of the indicating and reference means by moving solely the gear 20 with gears 16 and 24 stationary is therefore the converse or reverse of the action when gears 16 and 24 are rotated and gear 20 is held stationary. Stated differently, this position No. 4 functioning moves the dial 32 relatively to a stationary casing and a stationary pointer 43 and gives a compensating movement for the range pointer 44 and allows the aneroid means 11 to be stationary relatively to the casing 12 while the reference means 36 and 27 are properly set also.

In Fig. 7 are shown details of a modified setting means for the relative movement between reference means and a dial in somewhat the same manner as shown in connection with Figs. 1 and 2, but without requiring the shifting of the knob 99 corresponding to knob 53. In this illustration, the gear 95 may be understood as corresponding to gear 16 for rotating the aneroid means, and the gear for rotating the reference means is shown as the gear 96, corresponding either to gear 20 or 35.

A pinion 97, corresponding to gear 54, may be mounted on a shaft 98, to be turned by a knob 99. The pinion may be in engagement with gear 96 and also in engagement with the pinion 100 the teeth of which may be in mesh with those of gear 95. The pinion 100 may be fixed on a shaft 101, journaled in the walls 102 of an extension of the indicator casing 103. An expansion coil spring 104 may extend around the shaft 101 to react against pinion 100. By exerting an axial force on the shaft 101 against the force of spring 104 the pinion 100 may be moved out of engagement with gear 95. Hence, by turning the knob 99, the reference means may be moved without turning the aneroid means, so that the relationship of these parts and hence of the reference means to the dial may be adjusted.

Upon releasing the shaft 101 the gears reengage so that the desired relationship of reference means and aneroid means is always maintained. It will be understood that the shaft 101 may be made quite small and inconspicuous and may have its operative end disposed inwardly, so as to be inaccessible ordinarily. The setting device of Fig. 7 may be used in the instrument shown in Figs. 1 and 2.

Claims 35 and 36 to 42 inclusive are respectively copies of claims 14, 38, 41, 44, 45, 46, 47 and 48, except for a slight change in claim 14 now 35, of my original Letters Patent No. 1,857,311, granted to me May 10, 1932 for indicator. To accord with the description and terminology contained in the other parts of this specification, the term "indicator" in these copied claims designates the aneroid means 11.

What is claimed and desired to be secured by United States Letters Patent is:

1. An altimeter comprising pointer means including two pointers rotatable at different rates; altitude scale means for said pointer means; altitude responsive means for operating said pointer means at said different rates; a settable, only partially visible, reference member bearing numerals arranged in graduated order and mounted for rotation during setting; and setting means to cause a relative rotation between said pointer means and said altitude scale means and a corresponding change of indication of said reference member by a rotation at a faster angular rate than that of the slower pointer of said pointer means, and such that different numerals of said reference member corresponding to different reference indications become visible while others disappear, and such that a predetermined relation between the indication of said pointer means on said scale means and the reference indication by said reference member is maintained.

2. An altimeter comprising pointer means including two pointers, each rotatable at a different rate from the other; altitude indicating scale means for said pointer means; altitude responsive means for operating said pointer means relatively to said scale means; reference means including a member bearing numerals in graduated order and mounted and free to rotate about an axis substantially a complete rotation; setting means for causing a relative rotation between said scale means and said pointer means and for causing the numerals upon said reference means to rotate at a slower angular rate than that of the relative rotation between the faster pointer of said pointer means and said scale means and so that the change of indication of said pointer means is accompanied by a corresponding equivalent change in the indication of said member bearing numerals.

3. An altimeter comprising pointer means including two pointers rotatable at different rates; altitude scale means for said pointer means; altitude responsive means for operating said pointer means relatively to said altitude scale means; reference means including a member bearing numerals in graduated order indicating barometric pressures and rotatable about an axis substantially a complete rotation; setting means for causing a relative rotation between said scale means and said pointer means and for causing said member bearing numerals to rotate at a slower rate than that of the relative rotation between the faster pointer of said pointer means and said scale means and to effect a change of reference indication such that the sum of the change in the altitude indication of said pointer means relatively to said scale means and the change of barometric pressure indication of said member bearing numerals is a constant for different settings, in the same units.

4. The combination as set forth in claim 2 and further characterized by the fact that the major number of the numerals of said member bearing numerals are permanently obscured and that the setting rotation of said member moves the indications of said numerals into visibility in sequential order.

5. An altimeter comprising pointer means including two pointers rotatable in different degrees; altitude scale means for said pointer means; altitude responsive mechanism for operating said pointer means relatively to said scale means; two reference means rotatable at different rates, the slower reference means indicating in larger units than the faster reference means; setting means capable of causing a setting movement between said pointer means and said altitude scale means and a rotary movement of each said reference means throughout substantially a complete rotation and so that the sum of the change in pointer means indication relatively to said scale means and the change of indication in each of said reference means is a constant for different settings.

6. An altimeter comprising pointer means including two pointers rotatable in different degrees; altitude scale means for said pointer means; altitude responsive means for operating said pointer means; two reference means rotatable at different rates, and each capable of making a complete rotation, the slower reference means indicating in larger units than the faster reference means, the relation of the units of altitude for said slower reference means to the units of altitude for said faster reference means being proportional to the ratio of the different angular speeds of rotation for said two pointer means; setting means for causing a relative setting movement between said entire pointer means and said scale means and simultaneous and corresponding movements for both said reference means such that the changes of indications of said pointer means is accompanied by an equivalent change of indications of said two reference means.

7. An altimeter comprising pointer means; altitude scale means for said pointer means; a reference marker for said altitude scale means; additional reference means indicating barometric pressures; a manually manipulable member; setting means operable by said manually manipulable member for causing a relative setting movement between said altitude scale means and said pointer means and a corresponding equivalent change in said reference means indicating barometric pressure; and additional setting means for setting said reference marker relatively to said altitude scale means.

8. An altimeter comprising a dial having a circular indicating scale; aneroid means; a spindle rotatable by said aneroid means; a casing having provisions for holding said aneroid means stationary relatively thereto; a pointer concentrically rotatable relatively to said scale; planetary gearing interconnecting said spindle with said pointer; and means for revolving the axis of one of the planet gears of said planetary gearing about said spindle to effect a setting adjustment of said pointer relatively to said scale.

9. An aircraft measuring instrument comprising a yielding element operated by a varying force, the intensities of which are to be measured; two dissimilar pointers concentrically rotatable and constrained to rotate in the ratio of ten to one; a single scale graduated in the decimal system and cooperatively concentric with said pointers for the purpose of indicating the said intensities of said varying force; mechanism operatively connecting both said pointers with said yielding element operatively to rotate said pointers both in the same direction in the ratio of ten to one and in predetermined accord with changes in said varying force; reference means capable of being set at any indication throughout the range of said pointers in their combined indication; and a setting means for moving said reference means and said pointers relatively to said scale so that in the same units of measure, the positive change of said reference means indication is accompanied by an equal negative change in the indication of said pointers.

10. An altimeter comprising pointer means; scale means for said pointer means, said pointer means relatively to said scale means having an indication range in excess of 13,000 feet; reference means having a range of setting in excess of 13,000 feet; pressure sensitive means for operating said pointer means; and setting means for causing a relative movement between said pointer means and said scale means and a relative change of indication of said reference means such that the sum of the changes in the indication of said pointer means relatively to said scale means and in the indication of said reference means is a constant and is zero in terms of the same units of measurement.

11. An altimeter comprising pointer means; scale means for said pointer means; a rotatable reference member independent of said scale means and capable of effecting a complete rotation; pressure sensitive means for operating said pointer means; and setting means for causing a relative movement between said pointer means and said scale means and a relative change of indication of said reference means such that the sum of the changes in the indication of said pointer means relatively to said scale means and in the indication of said reference means is a constant and is zero in terms of the same unit of measure.

12. An altimeter comprising pointer means including two pointers intergeared to move in the ratio of ten to one and in the same direction; a single scale means reading from one to ten in common for both said pointers; reference means; a pressure sensitive device for effecting an indicating movement of said pointer means relatively to said scale means; and setting means for causing a relative movement between two of the aforementioned means with respect to the third means such that the sum of the changes in the indication of said pointer means relatively to said scale means and in the indication of said reference means is a constant and is zero in terms of the same unit of measure.

13. An altimeter comprising pointer means; a scale means for said pointer means; a reference means including a member independent from said scale means rotatable a complete rotation; a pressure sensitive device for effecting an indicating movement of said pointer means relatively to said scale means; and setting means for causing a relative movement between two of the aforementioned means with respect to the third means such that the sum of the changes in the indication of said pointer means relatively to said scale means and in the indication of said reference means is a constant and is zero in terms of the same unit of measure.

14. An altimeter comprising an atmospheric pressure sensitive means; an indicating means including a plurality of elements two of which are movable in different degrees by the pressure sensitive means relatively to a third element; a reference means, the latter and the indicating means being adapted to be set for different indications; a setting means for causing a setting movement of said reference means and a setting movement in said degrees of two elements of the indicating means, such that the sums of the setting changes of the reference means and of the elements movable in setting are maintained equal to zero.

15. The combination of a pressure sensitive means; a plurality of settable pointers actuated by said pressure sensitive means in different degrees; a settable barometric pressure reference element; a common scale for said pointers; setting means to cause changes in said different degrees in the indications of said pointers and to cause a corresponding equivalent change in the indication of said barometric pressure reference element, such that the changes in the indications of said pointers and reference element are negative and positive in character.

16. An altimeter having a common scale provided with scale indicia arranged for indications corresponding to barometric pressure; an atmospheric pressure sensitive means having a plurality of settable pointer means; an actuating mechanism operated by the pressure sensitive means to cause indicating movements of said pointer means in the ratio of one to ten; and setting means to cause changes of the indications of the pointer means in the ratio of one to ten.

17. An altimeter comprising a casing, an atmospheric pressure sensitive means therein having a plurality of settable pointers movable thereby in the ratio of one to ten; a common scale for the pointers graduated in units corresponding to barometric pressures and having a zero point; said pointers being operative by said pressure sensitive means to coincide with each other at said zero point at a pressure corresponding substantially to sea level altitude; setting means for causing changes of indication in the same ratio;

and means to cause a rotary movement of said pressure sensitive means, pointers and common scale relatively to said casing.

18. An atmospheric pressure sensitive altimeter comprising a movable indicating element; a movable reference element; a scale element having indicia increasing in one direction and graduated in units corresponding to barometric pressures, said elements being movable relatively to each other for setting; and means for causing the setting movements of the indicating and reference elements to be in opposite directions relatively to the scale element and covering a setting range for all of 10,000 feet.

19. An altimeter comprising an atmospheric pressure sensitive device having a plurality of indicating elements movable in different degrees; a planetary gearing coacting with said indicating elements; means for obtaining reference altitude indications; and setting means, said planetary gearing so coacting with said indicating elements and said setting means being so coordinated with said planetary gearing and the reference means as to cause setting changes in indications of said indicating elements and said reference means such that the sums of said changes are maintained equal to zero.

20. A device including an altimeter having a plurality of indicating elements, means responsive to atmospheric pressure, actuating means controlled thereby for causing a movement of said elements in different degrees, a second actuating means associated in planetary relation with the first mentioned actuating means, reference means including a barometric scale, and setting means for operating the reference means and the second actuating means so that the sums of equivalent setting changes of the reference means and said elements are maintained equal to zero, with the indicating elements being movable by the setting means in different degrees.

21. An altimeter including an indicating element, a scale element graduated in units corresponding to barometric pressures and associated with the indicating element for relative movement therebetwen, a reference means adapted for setting, and the reference means including a movable scale, atmospheric pressure responsive actuating means for moving one of the two first mentioned elements for normal indicating action, said elements being movable relatively to each other for setting, and setting means for moving the reference means and the element movable by the actuating means, the setting means including a planetary gear train engaged with the actuating means so that the element movable by the actuating means is movable alone for normal indicating action.

22. An altimeter including a scale element, an indicating element, the scale element and indicating element being associated for relative movement therebetween, a reference means, said reference means including a movable scale, said scale and scale element reading according to values corresponding to barometric pressures, means including an atmospheric pressure responsive member for moving one of the two first mentioned elements, a planetary gearing engaged with the second mentioned means, and a unitary means for moving the reference means and the planetary gearing, whereby the element movable by the second mentioned means is movable thereby independently of the reference means.

23. An altimeter including an atmospheric pressure sensitive means; an indicating element movable to and fro thereby according to changes in barometric pressures; a reference element, the latter and the indicating element having an initial relative position and being settable, and setting means for setting the indicating and reference elements with respect to said initial position, the indicating element being movable by the pressure sensitive means during setting, and the setting means including adjusting means for moving one only of the reference and indicating elements for changing the relation thereof to each other and to said initial position, said setting means and adjusting means being so related to the pressure sensitive means as not to affect the condition thereof nor the relation thereto of the indicating element.

24. An altimeter having a pressure sensitive means, an indicating element controlled thereby, a reference element, a scale element, said elements being movable relatively to each other for setting, the scale element and one of the other elements being settable, with the setting movement of the latter being twice the setting movement of the scale element so that the sums of the setting changes in the indications of said indicating and reference elements is equal to zero.

25. An aneroid altimeter including a normally stationary reference means, a pressure sensitive means, indicating means adapted to be actuated by said pressure sensitive means independently of the reference means, the latter and the indicating means being adapted for setting without affecting the response of the indicating means to the pressure sensitive means, said indicating and reference means both rotatable 360° and having individual indicia, and means coacting with said indicating and reference means so that a setting of the reference means is accompanied by a setting of the indicating means such that the sum of the changes in indicia indications thereof is maintained equal to zero.

26. An aneroid altimeter including a normally stationary reference means, a pressure sensitive means, indicating means adapted to be actuated by said pressure sensitive means independently of the reference means, the latter and the indicating means being adapted for setting each throughout 360° without affecting the response of the indicating means to the pressure sensitive means, said indicating and reference means having individual scales, and means coacting with said indicating and reference means so that a setting of the reference means is accompanied by a setting movement of the indicating means, said indicating means having a pointer element for its scale, the scales of the indicating and reference means being graduated for positive values, and the said coacting means causing a positive change in indication of the reference means to be accompanied by a negative setting between the pointer and scale of the indicating means such that the sums of the setting changes in scale indications of the reference and indicating means are maintained equal to zero.

27. In an altimeter, the combination with aneroid means including motion transmitting mechanism, an indicating element controlled thereby, a scale element for values corresponding to barometric pressures, and a reference element, the indicating, scale and reference elements being adapted for relative movement therebetween, of a setting means for the indicating, scale and reference elements arranged to cause a relative setting movement therebetween such that the change of indications of the indicating and reference elements vary in opposite directions in equal degrees and each has a rotary movement more than ⅔ of a rotation.

28. The combination of aneroid means including motion transmitting mechanism, and a plurality of indicating elements rotatable thereby in synchronized relation in different degrees for indicating changes of altitude, a common scale for said indicating elements, a rotary barometric reference element, said reference element being rotatable at least 240°, and setting means to cause a relative movement of said indicating elements in said different degrees and a corresponding equivalent movement of said barometric reference element.

29. A pressure responsive altimeter, including an indicating element, pressure responsive operating means therefor, a scale element for indications corresponding to barometric pressures, a reference element, said elements being movable relatively to each other for setting, and common means for causing a setting movement at will between the indicating, reference, and scale elements, and of the indicating, reference, and scale elements and the operating means as a unit so that the altimeter denotes an altitude condition to be maintained.

30. An altimeter having a means responsive to changes in barometric pressure, indicating means including a plurality of elements two of which are movable in the ratio of one to ten by the pressure responsive means relatively to a third element, said elements having a common zero initial position, a reference element, the latter and the indicating means being settable, and means for causing a setting movement in a common direction in said one to ten ratio of two elements of the indicating means and a movement in a different direction of the reference element, such that the sums of the setting changes are maintained equal to zero.

31. An altimeter including an atmospheric pressure responsive means, a plurality of pointers movable in the ratio of one to ten by said means, a common scale for both pointers coordinated therewith for readings corresponding to barometric pressures, said pointers being operative by the pressure responsive means so as to coincide at the zero point of the scale at sea level, and a reference element, the latter and the pointers being movable relatively to each other for setting, and setting means for causing changes in the indications of the pointers in the same ratio and a corresponding synchronous change of the reference element with the latter moving in a direction opposite to that of the pointers.

32. An altimeter including a scale element, an indicating element, a reference element, the scale element reading according to values corresponding to barometric pressures, means including an atmospheric pressure responsive means for moving the indicating element, mechanism including a planetary gearing interengaging two of the three first mentioned elements, and means for actuating the reference element and said mechanism such that one of the two first mentioned elements is movable by the pressure responsive means independently of the reference element.

33. An altimeter including an indicating element, a scale element graduated in units corresponding to barometric pressures, a reference means adapted for setting, means responsive to atmospheric pressure, means operated thereby for causing a relative movement between the indicating element and the scale element, said elements being movable relatively to each other for setting, and setting means including a planetary gearing coacting with the operated means and reference means, said planetary gearing being so coordinated with the operated means that one of the two first mentioned elements is movable by the operated means independently of the reference means, and the reference means and the independently movable element are settable as a unit by the setting means without affecting the pressure responsive means.

34. An altimeter including an atmospheric pressure sensitive means, an indicating element movable to and fro thereby according to changes in altitude, reference means, the latter and the indicating element being adapted for setting, and setting means for setting the indicating element and reference means without moving the pressure sensitive means, and the indicating element being operative by the latter independently of the reference means.

35. An altimeter having a plurality of pointer means, a scale means for the pointer means, an actuating means to cause indicating movements of the pointer means in the ratio of one to ten, and the pointer and scale means being so coordinated that both pointer means produce a zero indication on the scale means with the pointers coinciding with each other at zero, a reference means, the scale and reference means being movable relatively to each other in setting, and setting means for causing a relative movement between the pointer, reference and scale means such that the pointer and reference indications vary in opposite directions in equal degree relatively to the scale means.

36. An altimeter including an indicator, a plurality of pointers movable in the ratio of one to ten by said indicator, a common scale for both pointers, said pointers being operative by the indicator so as to coincide at the zero point of the scale at sea level, and reference means associated with said scale, and setting means for causing changes in the indications of the pointers in the same ratio and a simultaneous synchronous change of the reference means.

37. An altimeter having an indicator responsive to changes in atmospheric pressure, a common altitude scale means having a zero point, a plurality of pointers movable by the indicator in the ratio of one to ten, and the pointers coinciding at the zero point of the common scale means at sea level, and setting means for causing a change in the indications of the pointers in the same ratio with the scale means and indicator moving relatively to each other.

38. An altimeter including a casing, an indicator therein having a plurality of pointers movable thereby in the ratio of one to ten, a common scale for the pointers having a zero point, the pointers being operative by the indicator to coincide with each other at said zero point at a pressure corresponding substantially to sea level altitude, and means to cause a rotary movement of the indicator, pointers and common scale relative to said casing.

39. An altimeter including an indicator having a plurality of pointers movable thereby in the ratio of one to ten, a dial having a common scale for the pointers, reference means, a barometric scale at the face of the dial for the reference means, and setting means for causing the indications of the pointers to move according to said ratio and the indication of the reference means with the barometric scale to change synchronously therewith.

40. An altimeter having an indicator pointer means including a plurality of pointers movable thereby in the ratio of one to ten, reference means, a common scale for the pointer and reference means, and setting means to cause the scale indications of the pointer and reference means to change in opposite directions relatively to each other with the pointers moving in the ratio of one to ten.

41. An altimeter including an indicator, a plurality of pointers, a dial having individual scales for the pointers, reference means for the dial, said dial and reference means and pointers being interrelatively rotatable for setting the altimeter, said scales having equally angularly spaced indicia and the corresponding indicia on the different scales being in alined radial relation with each other, each of said scales having ten indicia, the pointers being movable by the indicator in a ratio of a multiple of one to ten, and the scales being calibrated in correspondence with the movement of the respective pointers.

42. An altimeter including a casing, an indicator therein, a plurality of pointers, a dial having concentric individual scales for the pointers, and means for rotating the indicator, pointers and dial as a unit relatively to the casing so that one of the pointers will indicate a condition to be maintained, said scales having equally angularly spaced indicia and the corresponding indicia on the different scales being in alined radial relation with each other, each of said scales having ten indicia, the pointers being movable by the indicator in a ratio of a multiple of one to ten, and the scales being calibrated in correspondence with the movement of the respective pointers.

PAUL KOLLSMAN.

DISCLAIMER

Re. 19,079.—*Paul Kollsman*, New York, N. Y. ALTIMETER. Patent dated February 13, 1934. Disclaimer filed April 30, 1937, by the patentee.

Hereby enters this disclaimer solely to claims 8, 19, 20, 21, 22, 32, and 33 and only as to said Reissue Letters Patent No. 19,079 above mentioned.

[*Official Gazette June 1, 1937.*]

with the barometric scale to change synchronously therewith.

40. An altimeter having an indicator pointer means including a plurality of pointers movable thereby in the ratio of one to ten, reference means, a common scale for the pointer and reference means, and setting means to cause the scale indications of the pointer and reference means to change in opposite directions relatively to each other with the pointers moving in the ratio of one to ten.

41. An altimeter including an indicator, a plurality of pointers, a dial having individual scales for the pointers, reference means for the dial, said dial and reference means and pointers being interrelatively rotatable for setting the altimeter, said scales having equally angularly spaced indicia and the corresponding indicia on the different scales being in alined radial relation with each other, each of said scales having ten indicia, the pointers being movable by the indicator in a ratio of a multiple of one to ten, and the scales being calibrated in correspondence with the movement of the respective pointers.

42. An altimeter including a casing, an indicator therein, a plurality of pointers, a dial having concentric individual scales for the pointers, and means for rotating the indicator, pointers and dial as a unit relatively to the casing so that one of the pointers will indicate a condition to be maintained, said scales having equally angularly spaced indicia and the corresponding indicia on the different scales being in alined radial relation with each other, each of said scales having ten indicia, the pointers being movable by the indicator in a ratio of a multiple of one to ten, and the scales being calibrated in correspondence with the movement of the respective pointers.

PAUL KOLLSMAN.

DISCLAIMER

Re. 19,079.—*Paul Kollsman*, New York, N. Y. ALTIMETER. Patent dated February 13, 1934. Disclaimer filed April 30, 1937, by the patentee.

Hereby enters this disclaimer solely to claims 8, 19, 20, 21, 22, 32, and 33 and only as to said Reissue Letters Patent No. 19,079 above mentioned.

[*Official Gazette June 1, 1937.*]